United States Patent
Ouyang (10) Patent No.: US 11,972,012 B2
(45) Date of Patent: Apr. 30, 2024

(54) AUTHORIZATION CHECK FOR NESTED QUERIES IN DATABASE SYSTEMS

(71) Applicant: SAP SE, Walldorf (DE)

(72) Inventor: Yinghua Ouyang, Xi'an (CN)

(73) Assignee: SAP SE, Walldorf (DE)

( * ) Notice: Subject to any disclaimer, the term of this patent is extended or adjusted under 35 U.S.C. 154(b) by 345 days.

(21) Appl. No.: 17/462,121

(22) Filed: Aug. 31, 2021

(65) Prior Publication Data

US 2023/0063528 A1   Mar. 2, 2023

(51) Int. Cl.
*G06F 21/62* (2013.01)
*G06F 9/54* (2006.01)
*G06F 16/2455* (2019.01)

(52) U.S. Cl.
CPC ........... *G06F 21/6227* (2013.01); *G06F 9/54* (2013.01); *G06F 16/24564* (2019.01)

(58) Field of Classification Search
None
See application file for complete search history.

(56) References Cited

U.S. PATENT DOCUMENTS

| | | | |
|---|---|---|---|
| 2004/0230572 A1* | 11/2004 | Omoigui | G06F 16/36 |
| 2012/0016901 A1* | 1/2012 | Agarwal | G06F 16/258 |
| | | | 707/769 |
| 2020/0073987 A1* | 3/2020 | Perumala | G06F 16/24545 |
| 2021/0056095 A1* | 2/2021 | Srivastava | G06F 16/27 |
| 2021/0073209 A1* | 3/2021 | Loaiza | G06F 16/2282 |

* cited by examiner

*Primary Examiner* — Brandon Hoffman
(74) *Attorney, Agent, or Firm* — Fish & Richardson P.C.

(57) ABSTRACT

Implementations of the present disclosure include receiving, by a database system, a query, providing, by the database system, a set of checker objects including one or more inner checker objects and an outer checker object, each checker object corresponding to a nested sub-query of the query, providing, by the database system, an authorization list associated with the outer checker object, and executing an authorization check on the query at least partially by: adding collected objects of each inner checker object to the authorization list, adding collected objects of the outer checker object to the authorization list, and determining authorization of an entity based on the authorization list.

20 Claims, 5 Drawing Sheets

AUTHORIZATION CHECK FOR NESTED QUERIES IN DATABASE SYSTEMS

BACKGROUND

Database systems store data that can be queried. For example, a query can be submitted to a database system, which processes the query and provides a result. Queries are submitted in a query language. An example query language includes, without limitation, the structured query language (SQL), which can be described as a standard database language that is used to create, maintain and retrieve data stored in a relational database (e.g., a database, in which data is stored in relational tables). In some instances, queries can include multiple layers of nested sub-queries.

Access to data can be restricted. For example, users and/or applications can have access to some data and may be denied access to other data. In querying a database system, an authorization check is performed to ensure that a source of the query (e.g., a user and/or an application querying a database system) is authorized to access data that may be returned in response to the query. The authorization check is executed during processing of the query, prior to actual access to data in the database system. However, authorization checks on queries having multiple layers of nested sub-queries is problematic.

SUMMARY

Implementations of the present disclosure include computer-implemented methods for querying a database system. More particularly, implementations of the present disclosure are directed to executing authorization checks on queries having nested sub-queries.

In some implementations, actions include receiving, by a database system, a query, providing, by the database system, a set of checker objects including one or more inner checker objects and an outer checker object, each checker object corresponding to a nested sub-query of the query, providing, by the database system, an authorization list associated with the outer checker object, and executing an authorization check on the query at least partially by: adding collected objects of each inner checker object to the authorization list, adding collected objects of the outer checker object to the authorization list, and determining authorization of an entity based on the authorization list. Other implementations include corresponding systems, apparatus, and computer programs, configured to perform the actions of the methods, encoded on computer storage devices.

These and other implementations may each optionally include one or more of the following features: executing the authorization check is performed during a semantics check of the query; determining authorization of an entity based on the authorization list is executed in response to determining that each nested sub-query is semantically correct; each checker object collects objects from a system catalog of the database system; collected objects correspond to database objects implicated by the query; determining authorization of an entity based on the authorization list includes calling a security application programming interface (API) using the authorization list as a parameter, the security API providing a response indicating authorization of the entity; and executing a semantics check on the query is executed in response to determining that the query has passed a syntax check.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for querying a database system. More particularly, implementations of the present disclosure are directed to executing authorization checks on queries having nested sub-queries. In some implementations, actions include receiving, by a database system, a query, providing, by the database system, a set of checker objects including one or more inner checker objects and an outer checker object, each checker object corresponding to a nested sub-query of the query, providing, by the database system, an authorization list associated with the outer checker object, and executing an authorization check on the query at least partially by: adding collected objects of each inner checker object to the authorization list, adding collected objects of the outer checker object to the authorization list, and determining authorization of an entity based on the authorization list.

Implementations of the present disclosure are described in further detail with reference to an example query language. The example query language includes the structured query language (SQL) as the language that is used to query the database system. It is contemplated, however, that implementations of the present disclosure can be realized with any appropriate query language.

To provide further context for implementations of the present disclosure, and as introduced above, database systems store data that can be queried. For example, a query can be submitted to a database system, which processes the query and provides a result. Queries are submitted in a query language. An example query language includes, without limitation, SQL, which can be described as a standard database language that is used to create, maintain and retrieve data stored in a relational database (e.g., a database, in which data is stored in relational tables). In some instances, queries can include multiple layers of nested sub-queries.

Access to data can be restricted. For example, users and/or applications can have access to some data and may be denied access to other data. In querying a database system, an authorization check is performed to ensure that a source of the query (e.g., a user and/or an application querying a database system) is authorized to access data that may be returned in response to the query. The authorization check is executed during processing of the query, prior to actual access to data in the database system.

In processing a query (e.g., a SQL query), the authorization check is performed during a semantics check. As described in further detail herein, the semantics check is performed to ensure that the semantics of the query matches the semantic of the database system. This is achieved by accessing a system catalog of the database system to obtain information associated with objects (e.g., tables, columns, views, procedures) implicated by the query. More particularly, a checker object is created for the query to collect information on catalog objects for each node in an abstract syntax tree (AST) that is generated by parsing the query. A checker object can be described as a transient data object that stores collected database catalog objects and their respective authorization types for subsequent authorization. After authorization is finished, the checker object is freed. The checker object adds information on collected objects to an authorization list. Example information can include, without limitation, for each entity, one or more roles that are authorized to access the respective object. For the authorization check, a security application programming interface (API) is invoked by passing the authorization list as a parameter. If the entity that issued the query is authorized to access the object, the query is executed. If the entity that issued the query is not authorized to access the object, the query is not executed (e.g., an error is returned).

As noted above, a checker object is created for the query to collect information on catalog objects for each node in an AST that is generated by parsing the query. However, a query can include one or more nested sub-queries, each of which would have a corresponding checker object. While the sub-queries are nested within the query, the checker objects are not nested. Consequently, authorization checks on queries having nested sub-queries are not representative of the queries. Further, a traditional approach to authorization checks for nested sub-queries requires hard-coding. This includes all possible syntax combinations in the query being enumerated and objects for authorization collected. In some examples, the query may need to be rewritten into an equivalent form before authorization. Such a traditional approach results in slower query processing time and consumes more technical resources (e.g., processing, memory).

In view of the foregoing, and as described in further detail herein, implementations of the present disclosure are directed to executing authorization checks on queries having nested sub-queries. More particularly, and as described in further detail herein, a set of checker objects including one or more inner checker objects and an outer checker object is provided, each checker object corresponding to a nested sub-query of the query. Catalog objects are collected from a system catalog of the database system for the innermost checker object first, then working outward to the outer checker object. For each checker object, information (e.g., authorization information) is added to an authorization list. The authorization list is associated with the outer checker object, but each inner checker object points to the authorization list, such that information associated with collected objects of each inner checker object is added to the authorization list. Authorization of an entity (e.g., user, application) that submitted the query is determined based on the authorization list.

Figure 1:
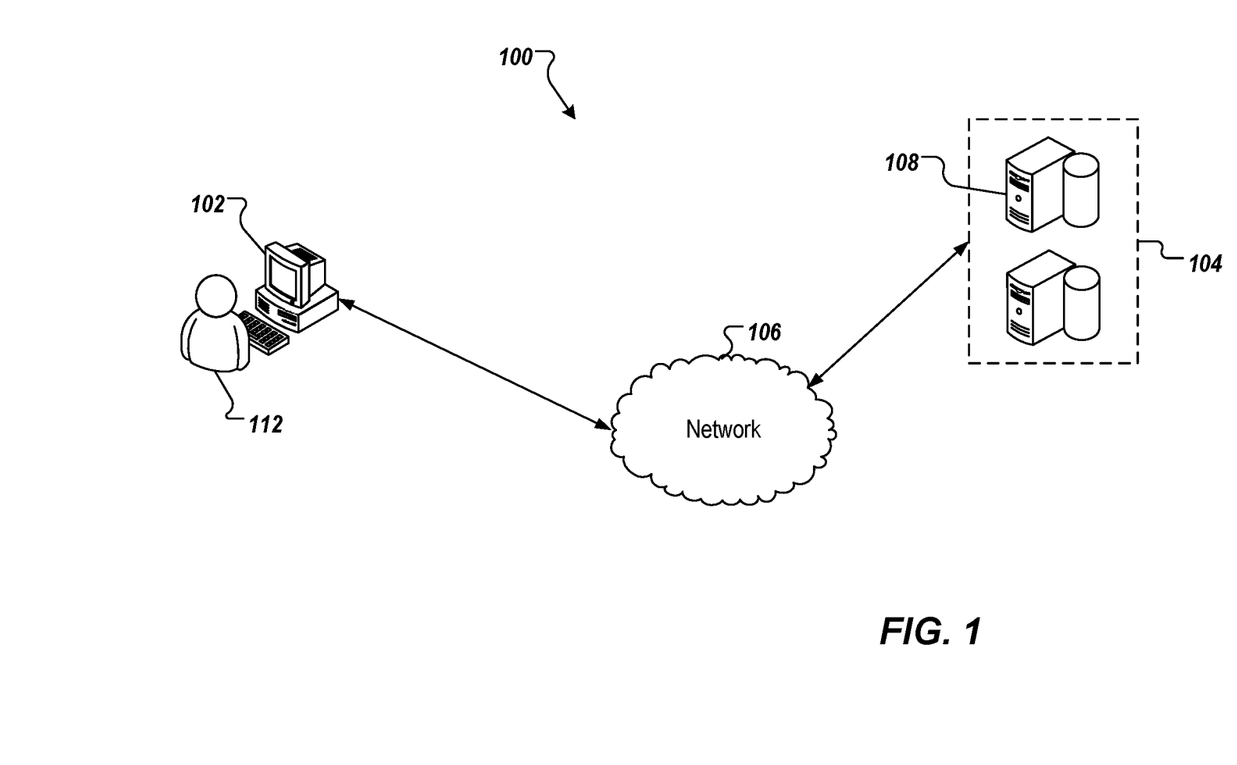
FIG. 1 depicts an example environment that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host a database system. In some examples, the database system is a database management system (DBMS), also referred to as database system herein, that stores data in relational tables (e.g., as a relational database). The database system can be provided as an in-memory database system that uses main memory for data storage. Main memory may include one or more types of random access memory (RAM) that communicates with one or more processors, e.g., CPU(s), over memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA provided by SAP SE of Walldorf, Germany.

In some examples, the database system can be queried by submitting a query to the database system, which processes the query to provide a query result. Queries can be submitted by entities, non-limiting examples of which can include users and applications. For example, the user 112 can access the database system using a client interface (e.g., open database connectivity (ODBC), Java database connectivity (JDBC), hypertext transfer protocol (HTTP)) through the client device 102.

In some examples, the ability of an entity to perform database operations on database objects stored within the database system is determined by the privileges that the entity has been granted. An example database operation can include accessing data (e.g., read data from a table). In some examples, privileges granted to a user are granted through assigning the user to one or more roles, and each role can include defined operations that can be performed. Objects within the database system can also each be associated with one or more roles. If the user has a role that matches a role assigned to the object, the user is authorized to perform defined operations on the object. Accordingly, each time a user tries to perform an operation on an object (e.g., by submitting a query), the database system performs an authorization check on the user. As introduced above, in some examples, the authorization check is performed during a semantics check of the query during query processing.

Figure 2:
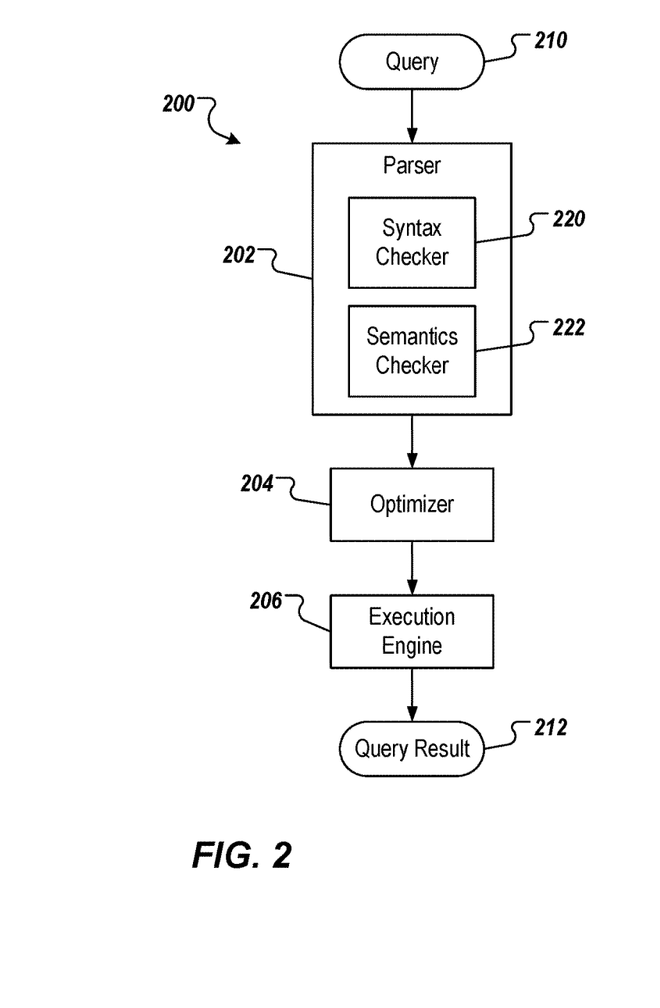
FIG. 2 depicts an example conceptual architecture in accordance with implementations of the present disclosure.

FIG. 2 depicts an example conceptual architecture 200 in accordance with implementations of the present disclosure. The example conceptual architecture 200 is representative of a query processing system within a database system. In the example of FIG. 2, the conceptual architecture 200 includes a parser 202, an optimizer 204, and an execution engine 206, each of which can be provided as one or more computer-executable programs. A query 210 is processed to provide a query result 212. The query result 212 includes data stored within the database system, the data being responsive to the query 210. For example, the following example query results in data being read from a table (with table name T1) and returned as a query result:

select * from T1

In further detail, the parser 202 includes a syntax checker 220 and a semantics checker 222. In some examples, the parser 202 parses the query to define a data structure that enables further processing. In some examples, the data structure includes an AST, which can be described as a tree representation of the abstract syntactic structure of the query written in a query language (e.g., SQL). The syntax checker 220 processes the query to ensure that the query is syntactically correct (e.g., conforms to rules for syntactically correct queries). For example, the following statement fails the syntax check, because the keyword from is misspelled:

select * form T1

The semantics checker 222 processes the query to ensure that the query is semantically correct. The semantics check can generally be described as determining whether a statement is meaningful in terms of what is being requested from the database system. That is, for example, whether the objects (e.g., tables, columns, views, procedures) in the statement actually exist within the database system. For example, and with reference to the example statement above, the statement would fail the semantic check, if the database system does not have a table with table name T1 stored therein. In some examples, the semantics check is performed using a checker object that collects information regarding objects (e.g., tables, columns, views, procedures) implicated by the query from a system catalog of the database system. In general, an object is implicated by the query if an operation (e.g., read) is to be performed on the object through execution of the query. In general, the system catalog records all objects (e.g., tables, columns, views, procedures) maintained within the database system and information associated therewith. Example information can include, without limitation, a set of roles that are assigned to the object, each role defining operations that can be performed on the object.

In some examples, if the system catalog does not include an object requested by the checker object, the semantic check fails, and an error is returned. For example, and with reference to the example query above, if the database system does not have a table with table name T1 stored therein, the system catalog is absent a record indicating a table with table name T1. In this case, a semantic error is returned, which indicates that the table does not exist in the database system. On the other hand, if the database system does have a table with table name T1 stored therein, the system catalog includes a record indicating a table with table name T1. In this case, the semantic check (at least for this particular object) is passed and information associated with the object (e.g., a set of roles) is returned. In some examples, for queries that implicate multiple objects, information associated with each object is returned. For example, a first set of roles is returned for a first object and a second set of roles is returned for a second object.

In some examples, the semantics checker 222 also performs an authorization check. For example, the checker object provides an authorization list that is included as a parameter of a call to a security API. The authorization list contains each object (provided from the system catalog) and its authorization type (e.g., for the example query select * from T1, the authorization list contains table T1 and its authorization type select). The security API processes the authorization list and provides an authorization result that indicates whether the entity (e.g., user) that submitted the query is authorized to access the data that would be returned by the query. For example, and with reference to the example query above, a security component checks whether the current entity (e.g., user, application) has select privilege on table T1, if yes authorization check passes otherwise it fails with an error (e.g., insufficient privilege). In some examples, the authorization list that includes a superset of roles. The superset of roles can include the sets of roles returned for objects implicated by the query. For example, and with reference to the example above, a superset of roles can include the first set of roles associated with the first object and the second set of roles associated with the second object.

If the syntax check, the semantics check, and the authorization check are all passed (i.e., there is no syntax error, there is no semantics error, there is no authorization error), the AST of the query is provided to the optimizer 204, which provides a query execution plan (QEP). In some examples, the QEP is a list of programmatic instructions that are to be executed to provide the query result 212. In some examples, the QEP includes a number of operations, which can include, for example and without limitation, read and write operations. In general, the QEP defines the sequence in which tables are accessed, methods used to extract data from each table, and methods for computing calculations, filtering, aggregating, and/or sorting data from each table. In some examples, multiple QEPs could be executed to provide the query result 212. However, the optimizer 204 outputs the QEP that is determined to be optimal (e.g., in terms of computing resources and memory expended to execute the QEP) among the multiple QEPs. The execution engine 206 executes the QEP provided by the optimizer 204 to provide the query result.

As introduced above, implementations of the present disclosure are directed to executing authorization checks on queries having nested sub-queries. For purposes of illustration, and without limitation, an example query with nested sub-queries is referenced herein. It is contemplated that implementations of the present disclosure can be realized with any appropriate query having nested sub-queries.

Figure 3:
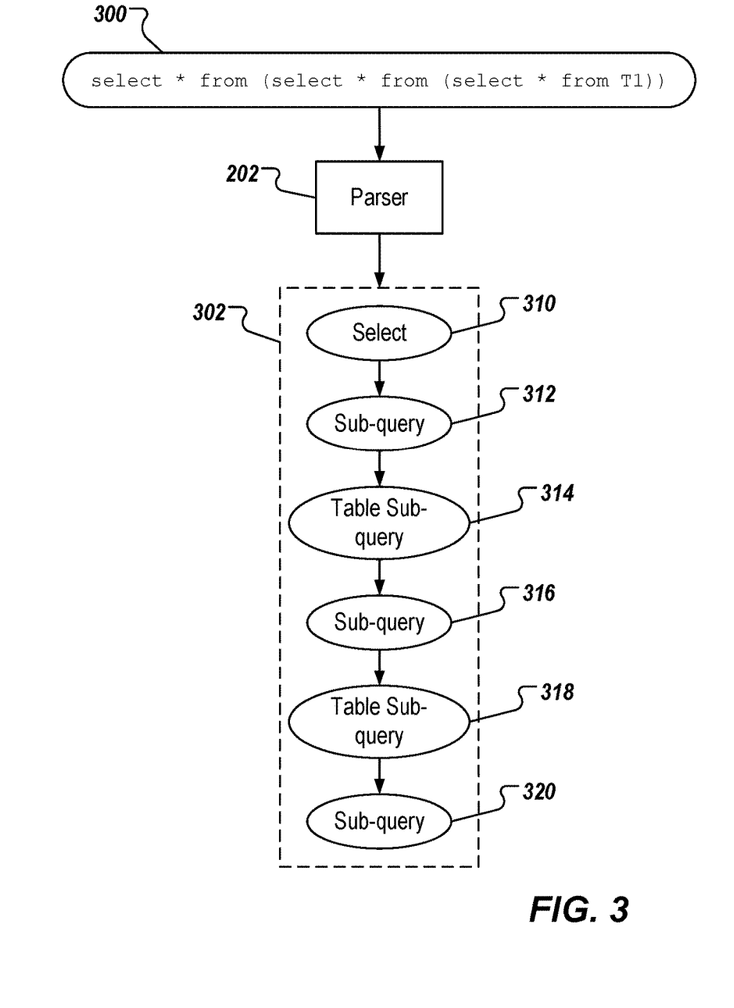
FIG. 3 depicts an example representation associated with a query having nested sub-queries.

FIG. 3 depicts an example representation associated with a query 300 having nested sub-queries. Here the non-limiting example query 300 is provided as:

select * from (select * from (select * from T1))

The example query 300 is parsed by the parser to provide an AST. For purposes of illustration, the example of FIG. 3 depicts a high-level parse tree 302. In the example of FIG. 3, the high-level parse tree 302 includes three layers of nested sub-queries, an outer layer represented by nodes 310, 312, an inner layer represented by nodes 314, 316, and an inner layer represented by nodes 318, 320. In some examples, the nodes 314, 318 functions as wrappers for sub-queries of nodes 316, 320, respectively.

In accordance with implementations of the present disclosure, for authorization check on queries having nested sub-queries (e.g., such as the example query 300 of FIG. 3), a checker object is provided for each of the inner sub-queries (inner checker object) and a checker object is provided for the outermost sub-query (outer checker object). An authorization list is provided for the outer checker object and all inner checker objects point to the authorization list. As described herein, catalog objects collected by each inner checker object are added to the authorization list of outer checker object during semantics checking of each inner checker object. After catalog objects are collected for all checker objects, the authorization list is submitted as a parameter of a call to the security API to execute the authorization check.

Figure 4:
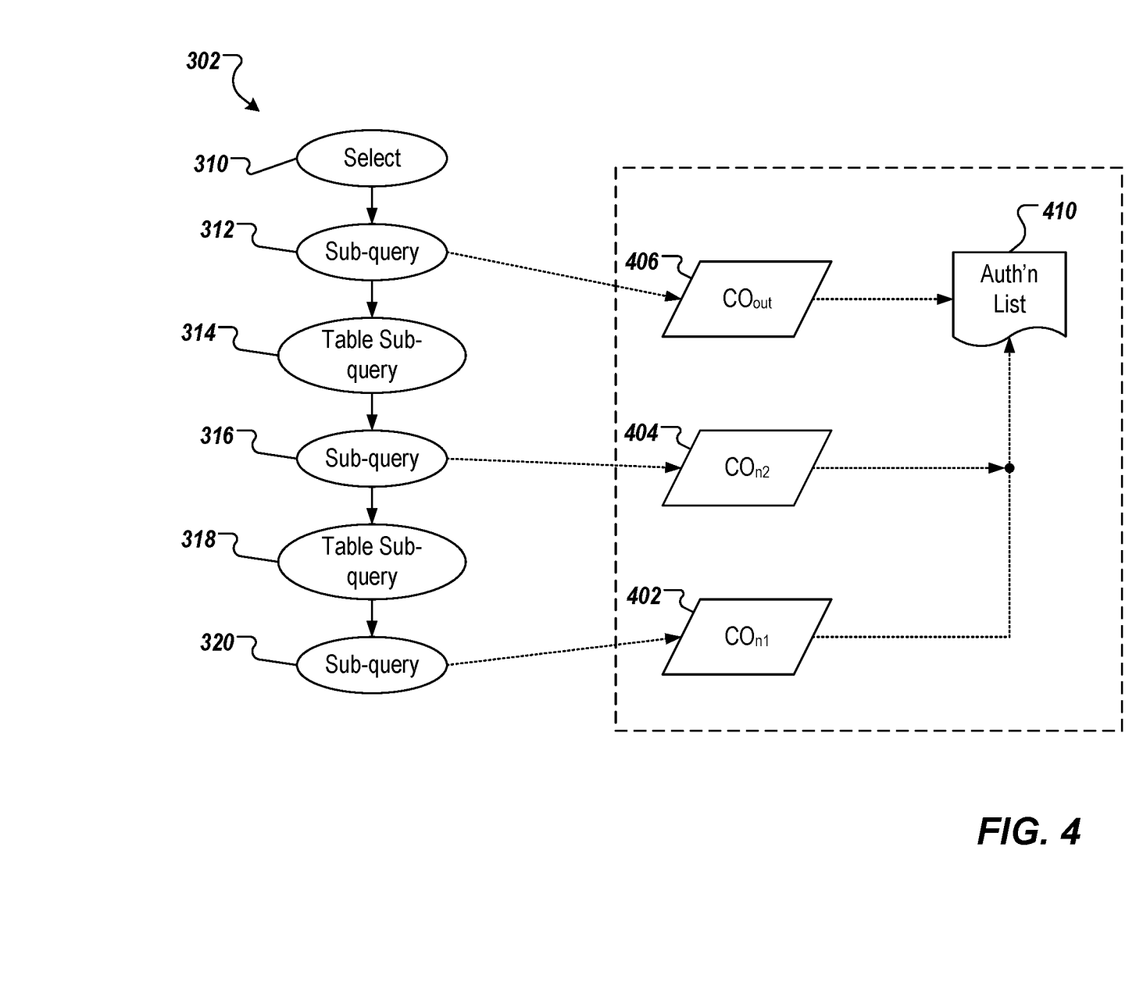
FIG. 4 depicts a conceptual representation of executing authorization checks on queries having nested sub-queries in accordance with implementations of the present disclosure.

FIG. 4 depicts a conceptual representation 400 of executing authorization checks on queries having nested sub-queries in accordance with implementations of the present disclosure. The example of FIG. 4 is based on the example high-level parse tree 302, which represents the example query 300 of FIG. 3. In the example of FIG. 4, a first inner checker object ($CO_{n1}$) 402, a second inner checker object ($CO_{n2}$) 404, and an outer checker object ($CO_{out}$) 406 are provided. An authorization list 410 is also provided and is associated with the outer checker object 406. Each of the first inner checker object 402 and the second inner checker object 404 points to the authorization list 410 of the outer checker object 406.

In executing the semantic check, catalog objects are collected for the innermost checker object first (e.g., the first checker object 402) working outward to the outer checker object (e.g., the outer checker object 406) and information is added to the authorization list (e.g., the authorization list 410). For example, and with reference to FIG. 4, the semantic check includes the first checker object 402 collecting catalog objects for the objects implicated in the nested sub-query represented by the first checker object 402, the catalog objects (e.g., set(s) of roles) being added to the authorization list 410. Next, the second checker object 404 collects catalog objects for the objects implicated in the nested sub-query represented by the second checker object 404, the catalog objects (e.g., set(s) of roles) being added to the authorization list 410. Finally, the outer checker object 406 collects catalog objects for the objects implicated in the nested sub-query represented by the outer checker object 406, the catalog objects (e.g., set(s) of roles) being added to the authorization list 410. Because all nested checker objects share the same authorization list of the outermost checker object, the authorization list 410 in the example of FIG. 4, the authorization list already has collected all database objects implicated by the query, the query 300 in the example of FIG. 4. The authorization check is invoke by passing the authorization list as a parameter to the security API.

Figure 5:
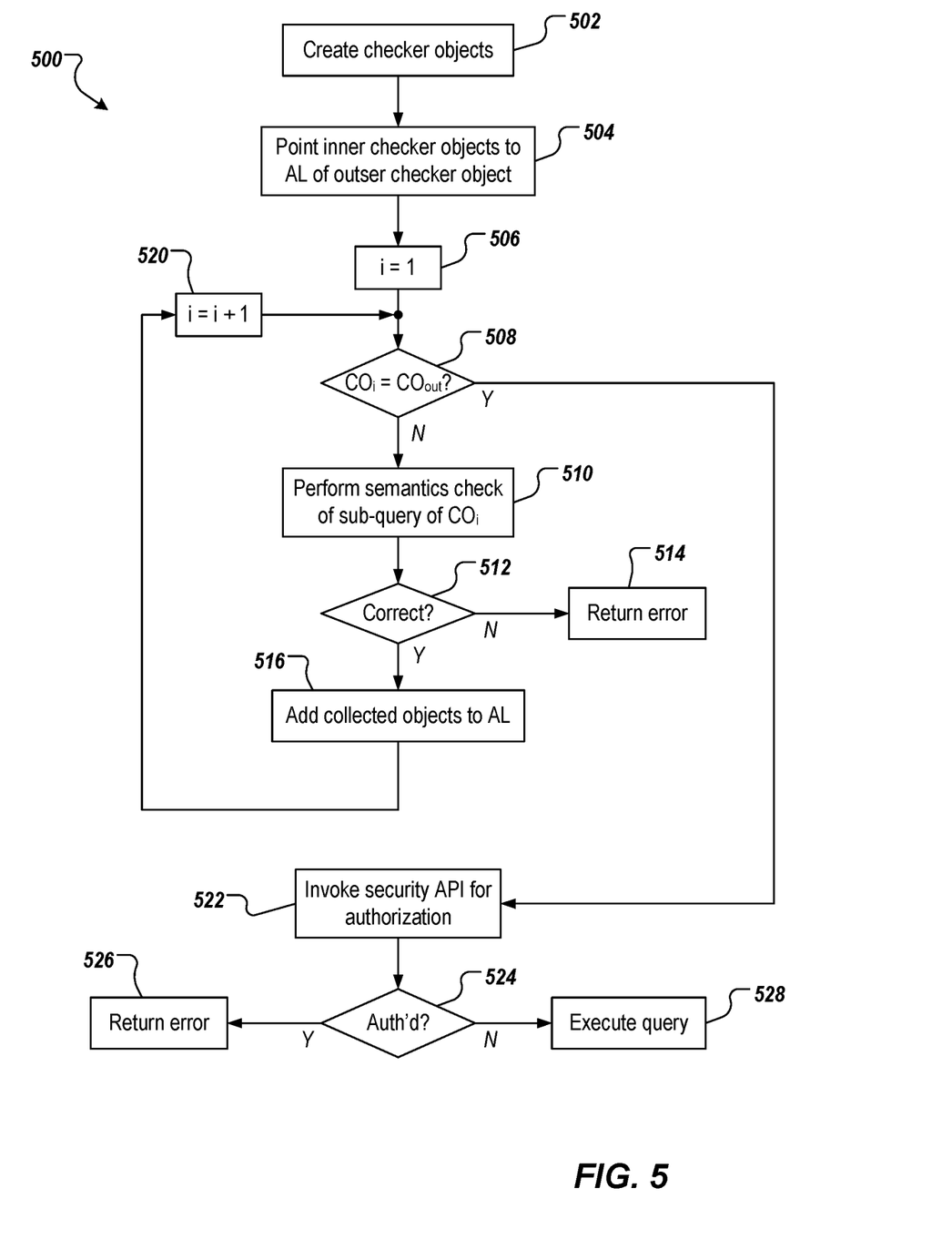
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices. In some examples, the example process 500 of FIG. 5 is executed after a query has been parsed and/or after a syntax check has been performed on the query and the query is determined to be syntactically correct (i.e., the query passes the syntax check).

Checker objects are provided (502). For example, the first inner checker object 402, the second inner checker object 404, and the outer checker object 406 of FIG. 4 are provided. Inner checker objects are pointed to an authorization list (AL) of the outer checker object (504). For example, the first inner checker object 402 and the second inner checker object 404 are configured to point to the authorization list 410 of the outer checker object 406 of FIG. 4. A counter i is set equal to 1 (506). It is determined whether a current checker object ($CO_i$) is the outer checker object ($C_{out}$) (508).

If the current checker object is not the outer checker object, a semantics check is performed for the sub-query of the current checker object (510). For example, and as described herein, the current checker object collects information on objects implicated by the sub-query from a system catalog of the database system. It is determined whether the sub-query of the current checker object is semantically correct (512). That is, it is determined whether the objects implicated by the sub-query of the current checker object exist within the database system. In some examples, during the collection process, if an object implicated in the sub-query of the current checker object does not exist in the database system, a semantics error is returned to the current checker object. If the sub-query of the current checker object is not semantically correct, an error is returned (514). For example, the database system returns a semantics error to an entity that submitted the query (e.g., a user). If the sub-query of the current checker object is semantically correct, collected objects are added to the authorization list (516), the counter i is incremented (520), and the example process 500 loops back. In some examples, a collected object represents complete metadata retrieved from the system catalog for specific database objects (e.g., table). For example, and with reference to the example query select * from T1, from the query a table name is identified as T1, and after searching the system catalog with T1, complete metadata of table T1 is returned. Example metadata can include, without limitation, a schema which T1 resides in, table type (e.g., column table, row table), and all column information (e.g., type of each column, name of each column).

If the current checker object is the outer checker object, a security API is invoked for authorization. For example, and as described herein, a call is made to the security API with the authorization list as a parameter. It is determined whether the authorization check is passed (524). For example, the security API provides a response that indicates whether the authorization check is passed (i.e., the entity that submitted the query is authorized to access database objects implicated by the query). If the authorization check is not passed, an error is returned (526). For example, the database system returns a semantics error to an entity that submitted the query (e.g., a user). If the authorization check is passed, the query is executed (528). For example, and with reference to FIG. 2, the parser 202 outputs the AST of the query to the optimizer 204 and the optimizer outputs a QEP to the execution engine 206, which executes the QEP to provide the query result 212.

Figure 6:
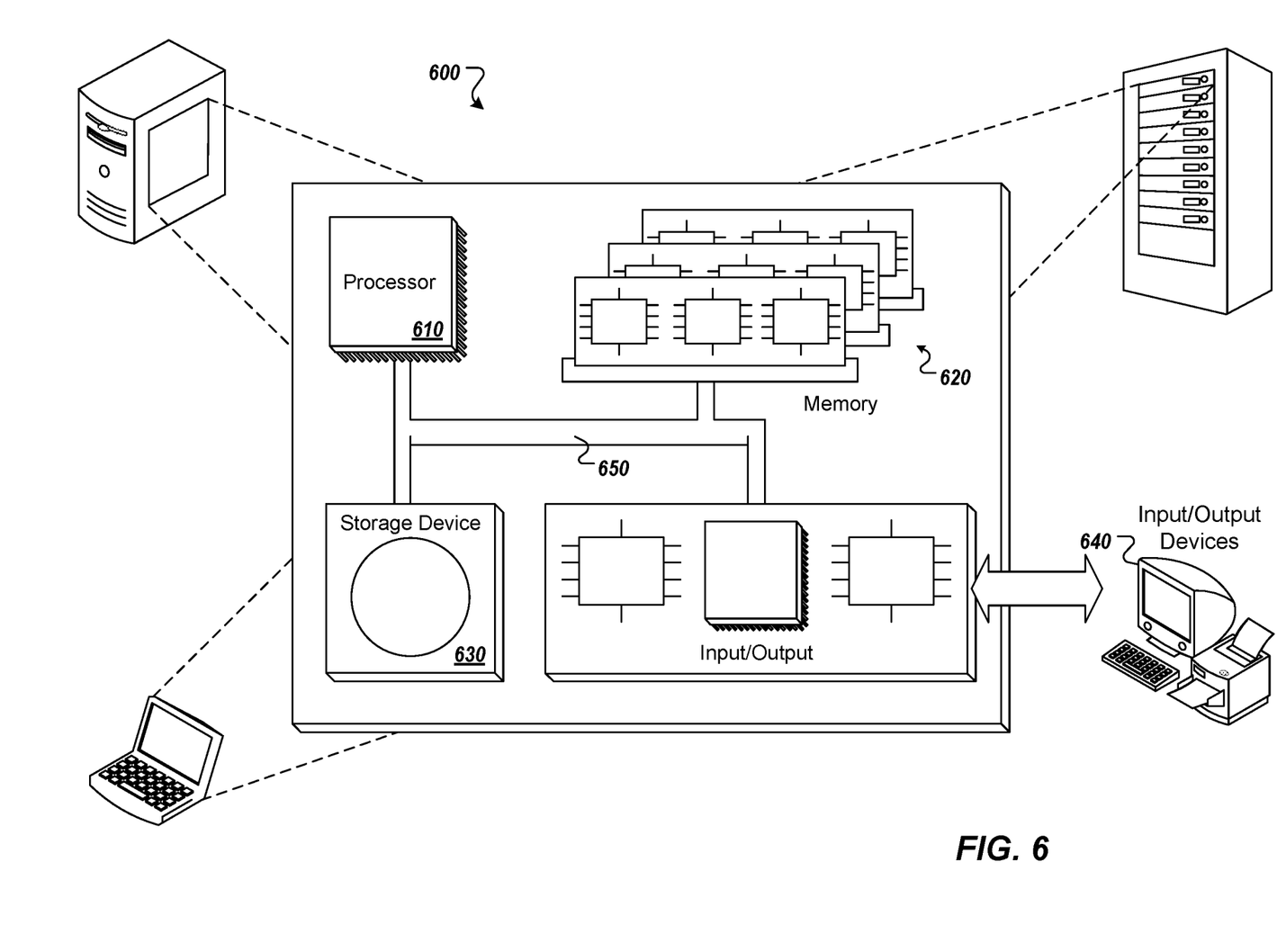
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a solid-state storage device, a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (e.g., one or more modules of computer program instructions, encoded on a computer program carrier) for execution by, or to control the operation of, data processing apparatus. The carrier may be a tangible non-transitory computer storage medium. Alternatively, or in addition, the carrier may be an artificially-generated propagated signal (e.g., a machine-generated electrical, optical, or electromagnetic signal) that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry (e.g., an FPGA (field programmable gate array), an ASIC (application-specific integrated circuit), or a GPU (graphics processing unit)). The apparatus can also include, in addition to hardware, code that creates an execution environment for computer programs (e.g., code that constitutes processor firmware, a protocol stack, a database management system, an operating system, or a combination of one or more of them).

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data (e.g., one or more scripts) stored in a markup language document, in a single file dedicated to the program in question, or in multiple coordinated files (e.g., files that store one or more modules, sub-programs, or portions of code).

The processes and logic flows described in this specification can be performed by one or more computers executing one or more computer programs to perform operations by operating on input data and generating output. The processes and logic flows can also be performed by special-purpose logic circuitry (e.g., an FPGA, an ASIC, or a GPU) or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

To provide for interaction with a user, implementations of the subject matter described in this specification can be implemented on, or configured to communicate with, a computer having a display device (e.g., a LCD (liquid crystal display) monitor, a LED (light-emitting diode) monitor, a OLED (organic LED) monitor) for displaying information to the user, and an input device by which the user can provide input to the computer (e.g., a keyboard) and a pointing device (e.g., a mouse, a trackball or touchpad). Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device (e.g., a smartphone, electronic tablet). Also, a computer can interact with a user by sending text messages or other forms of message to a personal device (e.g., a smartphone that is running a messaging application) and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable sub-combination. Moreover, although features may be described above as acting in certain combinations and even initially be claimed as such, one or more features from a claimed combination can in some cases be excised from the combination, and the claim may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for authorization checks of queries in database systems, the method being executed by one or more processors and comprising:
    receiving, by a database system, a query;
    providing, by the database system, a set of checker objects comprising one or more inner checker objects and an outer checker object, each checker object corresponding to a nested sub-query of the query, each checker object comprising transient data object that stores database catalog objects and respective authorization types that are collected for subsequent authorization;
    providing, by the database system, an authorization list associated with the outer checker object; and
    executing an authorization check on the query at least partially by:
        adding collected objects of each inner checker object to the authorization list,
        adding collected objects of the outer checker object to the authorization list, and
        determining authorization of an entity based on the authorization list.

2. The method of claim 1, wherein executing the authorization check is performed during a semantics check of the query.

3. The method of claim 1, wherein determining authorization of an entity based on the authorization list is executed in response to determining that each nested sub-query is semantically correct.

4. The method of claim 1, wherein each checker object collects objects from a system catalog of the database system.

5. The method of claim 1, wherein collected objects correspond to database objects implicated by the query.

6. The method of claim 1, wherein determining authorization of an entity based on the authorization list comprises calling a security application programming interface (API) using the authorization list as a parameter, the security API providing a response indicating authorization of the entity.

7. The method of claim 1, further comprising executing a semantics check on the query in response to determining that the query has passed a syntax check.

8. A non-transitory computer-readable storage medium coupled to one or more processors and having instructions stored thereon which, when executed by the one or more processors, cause the one or more processors to perform operations for authorization checks of queries in database systems, the operations comprising:
    receiving, by a database system, a query;

providing, by the database system, a set of checker objects comprising one or more inner checker objects and an outer checker object, each checker object corresponding to a nested sub-query of the query, each checker object comprising transient data object that stores database catalog objects and respective authorization types that are collected for subsequent authorization;

providing, by the database system, an authorization list associated with the outer checker object; and executing an authorization check on the query at least partially by:
  adding collected objects of each inner checker object to the authorization list,
  adding collected objects of the outer checker object to the authorization list, and
  determining authorization of an entity based on the authorization list.

9. The non-transitory computer-readable storage medium of claim 8, wherein executing the authorization check is performed during a semantics check of the query.

10. The non-transitory computer-readable storage medium of claim 8, wherein determining authorization of an entity based on the authorization list is executed in response to determining that each nested sub-query is semantically correct.

11. The non-transitory computer-readable storage medium of claim 8, wherein each checker object collects objects from a system catalog of the database system.

12. The non-transitory computer-readable storage medium of claim 8, wherein collected objects correspond to database objects implicated by the query.

13. The non-transitory computer-readable storage medium of claim 8, wherein determining authorization of an entity based on the authorization list comprises calling a security application programming interface (API) using the authorization list as a parameter, the security API providing a response indicating authorization of the entity.

14. The non-transitory computer-readable storage medium of claim 8, wherein operations further comprise executing a semantics check on the query in response to determining that the query has passed a syntax check.

15. A system, comprising:
a computing device; and
a computer-readable storage device coupled to the computing device and having instructions stored thereon which, when executed by the computing device, cause the computing device to perform operations for natural language explanations for authorization checks of queries in database systems, the operations comprising:

receiving, by a database system, a query;

providing, by the database system, a set of checker objects comprising one or more inner checker objects and an outer checker object, each checker object corresponding to a nested sub-query of the query, each checker object comprising transient data object that stores database catalog objects and respective authorization types that are collected for subsequent authorization;

providing, by the database system, an authorization list associated with the outer checker object; and executing an authorization check on the query at least partially by:
  adding collected objects of each inner checker object to the authorization list,
  adding collected objects of the outer checker object to the authorization list, and
  determining authorization of an entity based on the authorization list.

16. The system of claim 15, wherein executing the authorization check is performed during a semantics check of the query.

17. The system of claim 15, wherein determining authorization of an entity based on the authorization list is executed in response to determining that each nested sub-query is semantically correct.

18. The system of claim 15, wherein each checker object collects objects from a system catalog of the database system.

19. The system of claim 15, wherein collected objects correspond to database objects implicated by the query.

20. The system of claim 15, wherein determining authorization of an entity based on the authorization list comprises calling a security application programming interface (API) using the authorization list as a parameter, the security API providing a response indicating authorization of the entity.

* * * * *